US011223488B2

(12) United States Patent
Leibmann et al.

(10) Patent No.: US 11,223,488 B2
(45) Date of Patent: Jan. 11, 2022

(54) CLIENT CERTIFICATE AUTHENTICATION IN MULTI-NODE SCENARIOS

(71) Applicant: Microsoft Technology Licensing, LLC, Redmond, WA (US)

(72) Inventors: Matthias Leibmann, Redmond, WA (US); Grigory V. Kaplin, Redmond, WA (US); Chun-Hung Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/885,423

(22) Filed: May 28, 2020

(65) Prior Publication Data
US 2021/0377055 A1 Dec. 2, 2021

(51) Int. Cl.
*H04L 29/06* (2006.01)
*H04L 9/32* (2006.01)
*H04L 9/30* (2006.01)

(52) U.S. Cl.
CPC .......... *H04L 9/3268* (2013.01); *H04L 9/3073* (2013.01); *H04L 9/3213* (2013.01)

(58) Field of Classification Search
None
See application file for complete search history.

(56) References Cited

U.S. PATENT DOCUMENTS

| 9,276,869 | B2 | 3/2016 | Dodd et al. | |
| 10,951,661 | B1* | 3/2021 | Medan | H04L 63/126 |
| 2014/0059658 | A1 | 2/2014 | Stecher | |
| 2017/0230349 | A1 | 8/2017 | Gaur et al. | |
| 2019/0007409 | A1 | 1/2019 | Totale et al. | |
| 2019/0312857 | A1* | 10/2019 | Lander | G06F 16/27 |
| 2020/0005278 | A1* | 1/2020 | Vudathu | H04L 63/0853 |
| 2020/0097717 | A1* | 3/2020 | Young | G06N 3/08 |
| 2021/0168128 | A1* | 6/2021 | Carru | H04L 9/3213 |

OTHER PUBLICATIONS

Andrew Slivker, "How API Gateways help to integrate with OAuth security models—part 1", Dec. 1, 2016, https://nevatech.com/blog/post/How-API-Gateways-help-to-integrate-with-OAuth-security-models, accessed Aug. 28, 2021, pp. 1-12. (Year: 2016).*

(Continued)

*Primary Examiner* — Jeffery L Williams
(74) *Attorney, Agent, or Firm* — Christopher J. Volkmann; Kelly, Holt & Christenson, PLLC

(57) ABSTRACT

A routing plane includes an authentication packaging system that receives client authentication information, as part of a request from a requesting client that is to be routed to a target service. The authentication packaging system combines the authentication information with assertion information indicative of an assertion as to the identity of the routing plane, using an entropy, such as a signing key. The authentication package is attached to the request and is sent to the target service. The target service validates the authentication package based on the entropy and authenticates the routing plane based on the assertion information and performs authentication processing based on the authentication information.

20 Claims, 7 Drawing Sheets

(56) References Cited

OTHER PUBLICATIONS

Bryant Bost, "Use AWS Lambda authorizers with a third-party identity provider to secure Amazon API Gateway REST APIs", Mar. 25, 2020; https://aws.amazon.com/blogs/security/use-aws-lambda-authorizers-with-a-third-party-identity-provider-to-secure-amazon-api-gateway-rest-apis/; accessed Aug. 28, 2021, pp. 1-13. (Year: 2020).*

"JSON Web Token—Wikipedia", Retrieved From: https://en.wikipedia.org/w/index.php?title=JSON_Web_Token&oldid=945404944, Mar. 13, 2020, 6 Pages.

"International Search Report and Written Opinion issued in PCT Application No. PCT/US21/024751", dated Jun. 1, 2021, 12 Pages.

"Generate and Configure an SSL Certificate for Backend Authentication", Retrieved from: https://web.archive.org/web/20191021190328/https://docs.aws.amazon.com/apigateway/latest/developerguide/getting-started-client-side-ssl-authentication.html, Oct. 21, 2019, 7 Pages.

"Plan an API Gateway systems", Retrieved from: https://docs.oracle.com/cd/E65459_01/admin.1112/e65449/content/admin_planning.html, Retrieved Date: Apr. 21, 2020, 9 Pages.

"What is API Gateway Authentication?", Retrieved from: https://konghq.com/learning-center/api-gateway/api-gateway-authentication/, Retrieved Date: Apr. 21, 2020, 10 Pages.

Barr, Jeff, "Elastic Load Balancer SSL Support Options", Retrieved from: https://aws.amazon.com/blogs/aws/elastic-load-balancer-ssl-support-options/, Aug. 30, 2011, 7 Pages.

Boeglin et al., "Using API Gateways in Microservices", Retrieved from: https://docs.microsoft.com/en-us/azure/architecture/microservices/design/gateway, Oct. 23, 2018, 6 Pages.

Macy et al., "Acquire and cache tokens using the Microsoft authentication library (MSAL)", Retrieved from: https://docs.microsoft.com/en-us/azure/active-directory/develop/msal-acquire-cache-tokens, Nov. 7, 2019, 6 Pages.

Mostafa, Siraj, "Securing Microservices: The API gateway, authentication and authorization", Retrieved from: https://sdtimes.com/apis/securing-microservices-the-api-gateway-authentication-and-authorization/, Sep. 20, 2017, 9 Pages.

Sharma et al., "Overview of TLS termination and end to end TLS with Application Gateway", Retrieved from: https://docs.microsoft.com/en-us/azure/application-gateway/ssl-overview, Mar. 19, 2019, 10 Pages.

* cited by examiner

CLIENT CERTIFICATE AUTHENTICATION IN MULTI-NODE SCENARIOS

BACKGROUND

Computing systems are currently in wide use. Some such computing systems are deployed in architectures where applications, services and microservices are accessed by clients, through scalable routing planes, such as API gateways. The routing plane receives a request from a requesting client (such as a requesting application) and routes that request to a target entity, such as a target service, where the request is processed.

In some architectures, the components in the routing plane terminate the request and transform the request into a new request that is sent to the target service. As part of the termination process, some original authentication statements corresponding to the requesting client can be lost. For instance, certificate-based authentication statements are lost in this type of termination.

The discussion above is merely provided for general background information and is not intended to be used as an aid in determining the scope of the claimed subject matter.

SUMMARY

A routing plane includes an authentication packaging system that receives client authentication information, as part of a request from a requesting client that is to be routed to a target service. The authentication packaging system combines the authentication information with assertion information indicative of an assertion as to the identity of the routing plane, using an entropy, such as a signing key. The authentication package is attached to the request and is sent to the target service. The target service validates the authentication package based on the entropy and authenticates the routing plane based on the assertion information and performs authentication processing based on the authentication information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
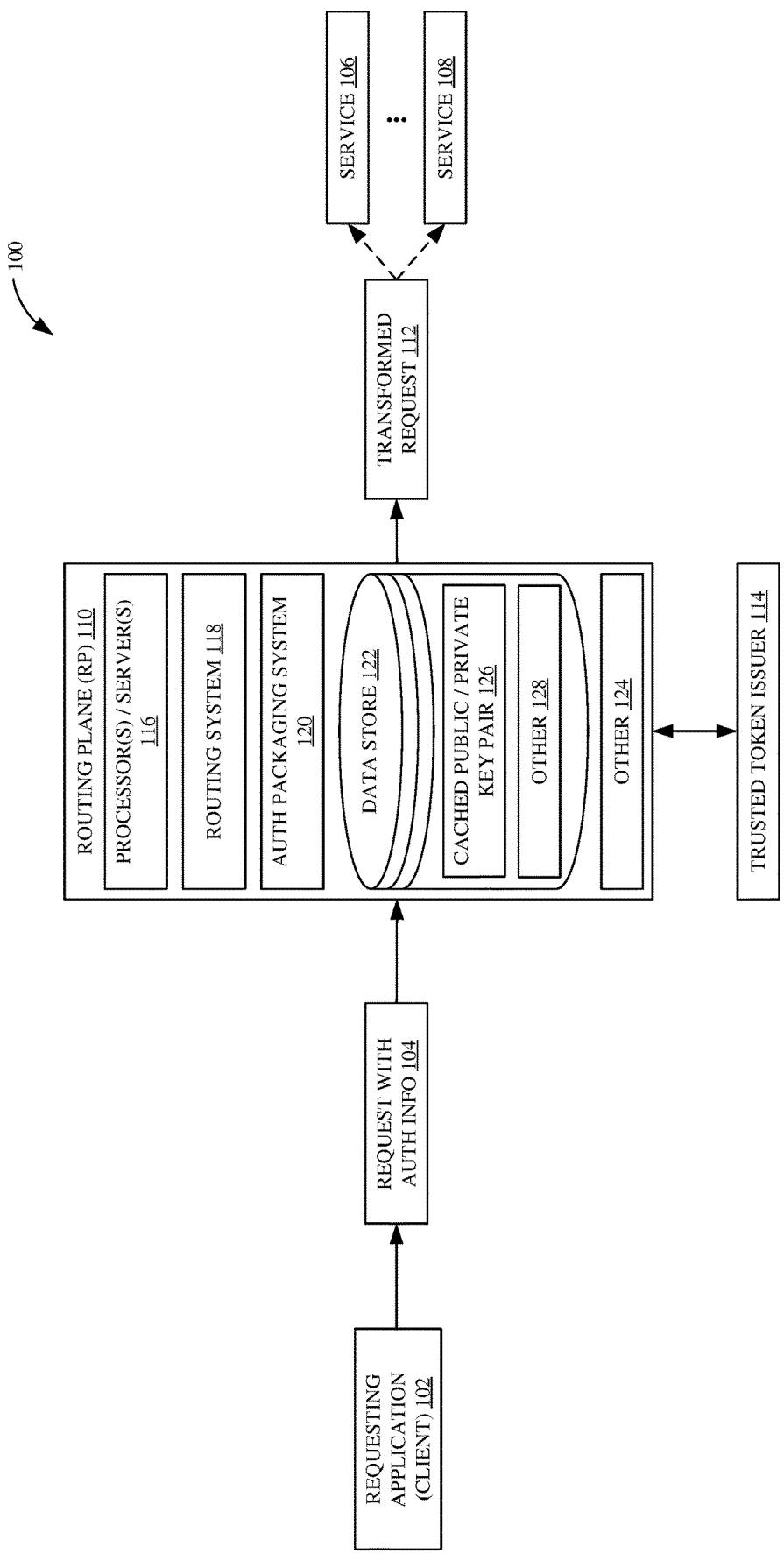
FIG. 1 is a block diagram of one example of a computing system architecture in which a routing plane transforms a request, by repackaging authentication information, and forwards the transformed request, to a target service.

As discussed above, it is not uncommon for a component in a routing plane to terminate a request from a requesting client and transform it into a different request before sending it on to the target service (or other target entity) for processing. In doing this, some authentication statements that are in the request may be lost. Thus, in order to address this, some current systems do authentication credential processing in the routing plane. That is, instead of leaving authentication to the target service, the routing plane takes on the responsibility of authenticating the credentials of the requesting client.

However, this is a very costly operation in terms of computing resources and time, and it can thus greatly increase the time required for the routing plane to route the message properly. Also, the original credentials may include an intent which is normally used by the target service to authenticate the request. When the credentials are lost, the intent that is carried by the original credentials is also lost. Thus, the target service cannot validate or authenticate the intent.

Other current systems simply perform an unsecure forwarding of the credentials. That is, some routing planes simply forward the credentials "as is" to the target service. This poses its own problems. It can be dangerous, because the target service must then rely on other mechanisms to decide whether the credentials should be accepted. In some cases, network access control lists (ACL) can be used, but these are costly and difficult to maintain, and in some cases are impractical. In addition, by performing a simple "as-is" forward of the credentials, the credentials can be surreptitiously obtained and replayed to perform a surreptitious attack. This allows other entities to impersonate the original client throughout the system and to thus gain access to otherwise protected data.

The present description thus proceeds with respect to a system in which a routing plane receives a request and transforms the request before routing it to a target service. (It will be noted that the target may be an application, a service, a microservice, etc., but they are collectively referred to herein as a target service). The client request has client authentication information (such as an authentication certificate). The routing plane creates an envelope or package for that client authentication information and reattaches the envelope or package to the request before sending the request onto the target service. The envelope or package includes the client authentication information along with an assertion as to the identity of the routing plane. The package can be signed, at the routing plane, with a signing key so that the target service can determine whether the package has been tampered with. If not, the target service can validate that the package was received from a trusted routing plane and proceed to perform authentication processing based upon the client authentication information contained in the package.

FIG. 1 is a block diagram of one example of a computing system architecture 100. Architecture 100 includes a requesting application (or client) 102 that is shown sending a request 104 to one of a plurality of different target services 106-108. FIG. 1 also shows that architecture 100 includes routing plane 100. Routing plane 100 receives request 104, and identifies it as a request with authorization and/or authentication (AUTH) information. It repackages the AUTH information and reattaches it to the request and sends the transformed request, as transformed request 112, to the desired target service 106-108 for processing. FIG. 1 also shows that architecture 100 includes a trusted token issuer 114 that can interact with routing plane 110 to provide tokens for communication between routing plane 110 and the various services 106-108.

Before providing additional description, it will be noted that FIG. 1 shows requesting application 102. It will be noted that requesting application 102 can be any requesting entity or client that submits a request to another application, service or microservice through a routing plane. Also, while services 106-108 are illustrated in the architecture 100 shown in FIG. 1, it will be noted that they could also be other applications or microservices that receive requests from the requesting client (in this case requesting application) 102, through routing plane 110.

FIG. 1 shows that, in one example, routing plane 100 includes one or more processors or servers 116, routing system 118, AUTH packaging system 120, data store 122, and it can include a wide variety of other items 124. Data store 122, itself, can include a cached public/private key pair 126, and it can include other items 128.

Before describing the overall operation of architecture 100, a brief description of some of the items in architecture 100, and their operation, will first be provided. Routing plane 110 can include a wide variety of different types of components that receive requests from requesting clients and identify a target service where the requests are to be routed. In the example shown in FIG. 1, routing system 118 analyzes the requests and determines how to route them (e.g., which service 106-108 is the target service that will receive the request).

AUTH packaging system 120 identifies the request 104 as one that contains AUTH information (such as client authentication and/or authorization information) that is to be processed by the target service. Thus, system 120 can request a token from trusted token issuer 114 that asserts the identity of routing plane 110. System 120 combines the AUTH information in request 104 with the token. It can also include additional validation information such as a temporal validity indicator, indicating how long the request is valid, as well as a target service identifier that identifies the target service, among other things. AUTH packaging system 120 then signs that package with a key from the cached public/private key pair 126 and attaches the signed package to the request. The new request with the attached package, is output as transformed request 112. The transformed request 112 is routed by routing system 118 to the appropriate target service 106-108.

The target service then uses a corresponding key in the public/private key pair 126 (which is stored on or obtained by the service) to determine whether the package was tampered with. If not, the service then determines whether the request came from a trusted source (e.g., routing plane) based on the assertions made by the token. If so, the service can then validate that the package is still within a temporal validation window defined by the temporal validation indicator. The service can also, validate that the package was intended to be received by the target service, itself. If those validations are performed, then the target service can access the AUTH information in the package and perform authentication processing to determine whether the request, itself, is authentic and authorized.

Figure 2:
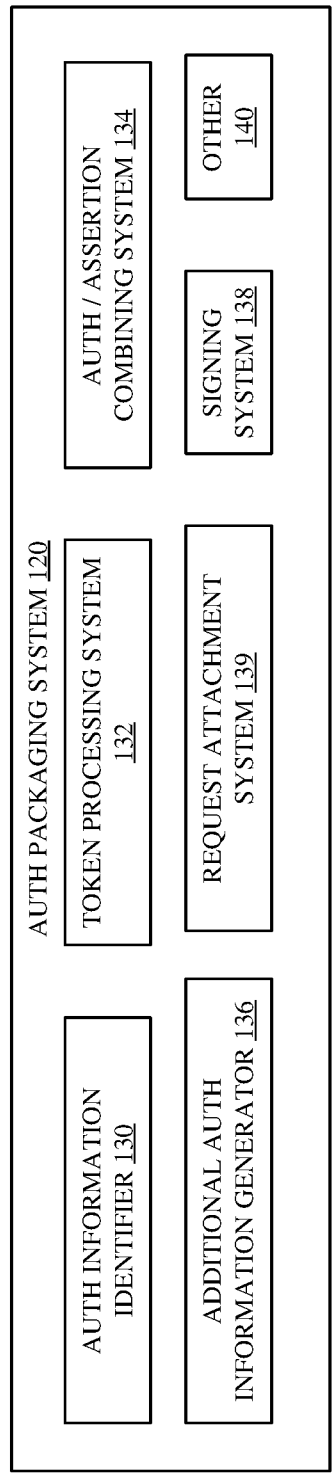
FIG. 2 is a block diagram showing one example of an AUTH packaging system, in more detail.

FIG. 2 is a block diagram showing one example of AUTH packaging system 120, in more detail. In the example shown in FIG. 2, AUTH packaging system 120 includes AUTH information identifier 130, token processing system 132, AUTH/assertion combining system 134, additional AUTH information generator 136, signing system 138, request attachment system 139, and it can include a wide variety of other items 140. Briefly, in operation, AUTH information identifier 130 identifies that request 104 has AUTH information that needs to be repackaged. It extracts that information from request 104 as well. Token processing system 132 interacts with trusted token issuer 114 to obtain a token that asserts the identity of routing plane 110. AUTH/assertion combining system 134 combines the AUTH information extracted by AUTH information identifier 130 with the assertion represented by the token obtained by token processing system 132. Additional AUTH information generator 136 can generate additional authorization/authentication information (such as the temporal validation indicator, the identity of the target service, etc.). All of these items are illustratively combined into the AUTH package which is then signed by signing system 138. Signing system 138 illustratively signs the AUTH package with a key from the cached public/private key pair 126 so that the target service can determine whether the package has been tampered with. Request attachment system 139 then attaches the AUTH package to the request to obtain the transformed request.

Figure 3:
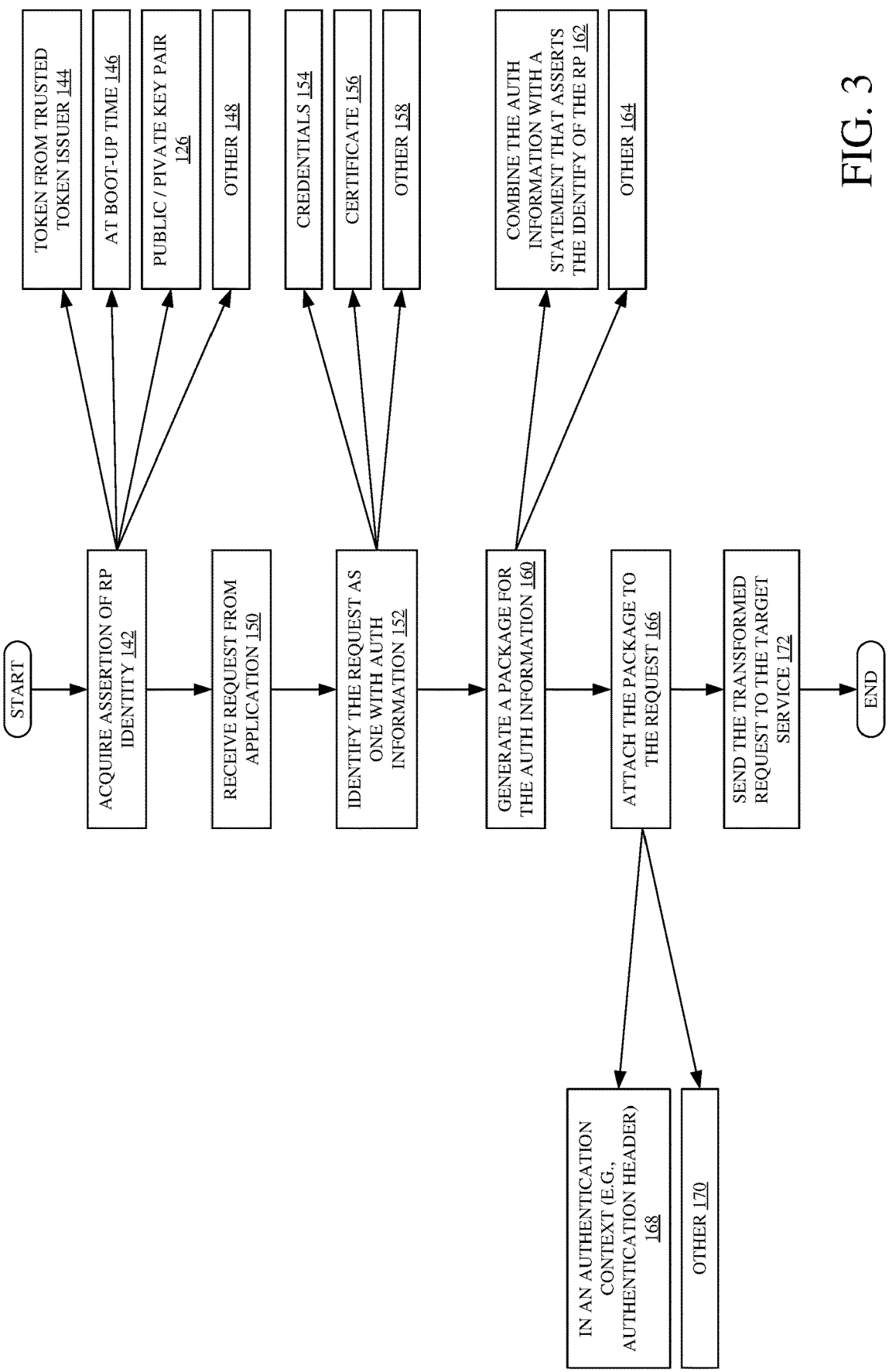
FIG. 3 is a flow diagram illustrating one example of the overall operation of the architecture illustrated in FIG. 1.

FIG. 3 is a flow diagram illustrating one example of the overall operation of architecture 110 in receiving a request 104, transforming it, and then routing it to a target service. Token processing system 132 first generates or acquires an assertion as to the identity of routing plane 110. This is indicated by block 142 in the flow diagram of FIG. 3. The assertion can be in the form of a token issued by trusted token issuer 114. This is indicated by block 144. It can be obtained at bootup time or another time, as indicated by block 146. Token processing system 132 can also obtain a public/private key pair 126 from a key generator and store it in data store 122. It can be stored in cache, or other memory. The assertion as to the identity of routing plane 110 can be obtained in other ways as well, and this is indicated by block 148.

At some point, routing plane 110 receives a request 104 from a requesting entity (such as requesting application or client 102). This is indicated by block 150 in the flow diagram of FIG. 3. AUTH information identifier 130 then identifies the request 104 as one with AUTH information that needs to be transformed. This is indicated by block 152. For instance, identifier 130 can examine the request to determine whether AUTH information is included in it. The AUTH information can include client credentials 154 of the requesting application 102. The AUTH information can include an authorization certificate 156, or any of a wide variety of AUTH information 158.

AUTH packaging system 120 then repackages the AUTH information. This is indicated by block 160. In doing so, it can combine the AUTH information from request 104 with the statement that asserts the identity of the routing plane 110 (e.g., the token obtained from trusted token issuer 114). Combining the AUTH information with the assertion statement is indicated by block 162. The package can be generated with a wide variety of other information, and in other ways as well, some of which are described in greater detail below, and this is indicated by block 164.

Request attachment system 139 then attaches the package to the request (or the partially transformed request—the request after the client AUTH information has been removed for repackaging), as indicated by block 166, and provides it as transformed request 112. In one example, the AUTH package is attached to the request 104 in an authentication context. For instance, system 139 may identify an authorization or authentication header in a HTTP message, or other authorization or authentication contexts and attach the AUTH package there. This is indication by block 168. The package can be attached to the request in other ways as well, and this is indicated by block 170.

Routing system 118 then sends the transformed request 112 to the target service. This is indicated by block 172 in the flow diagram of FIG. 3.

Figure 4:
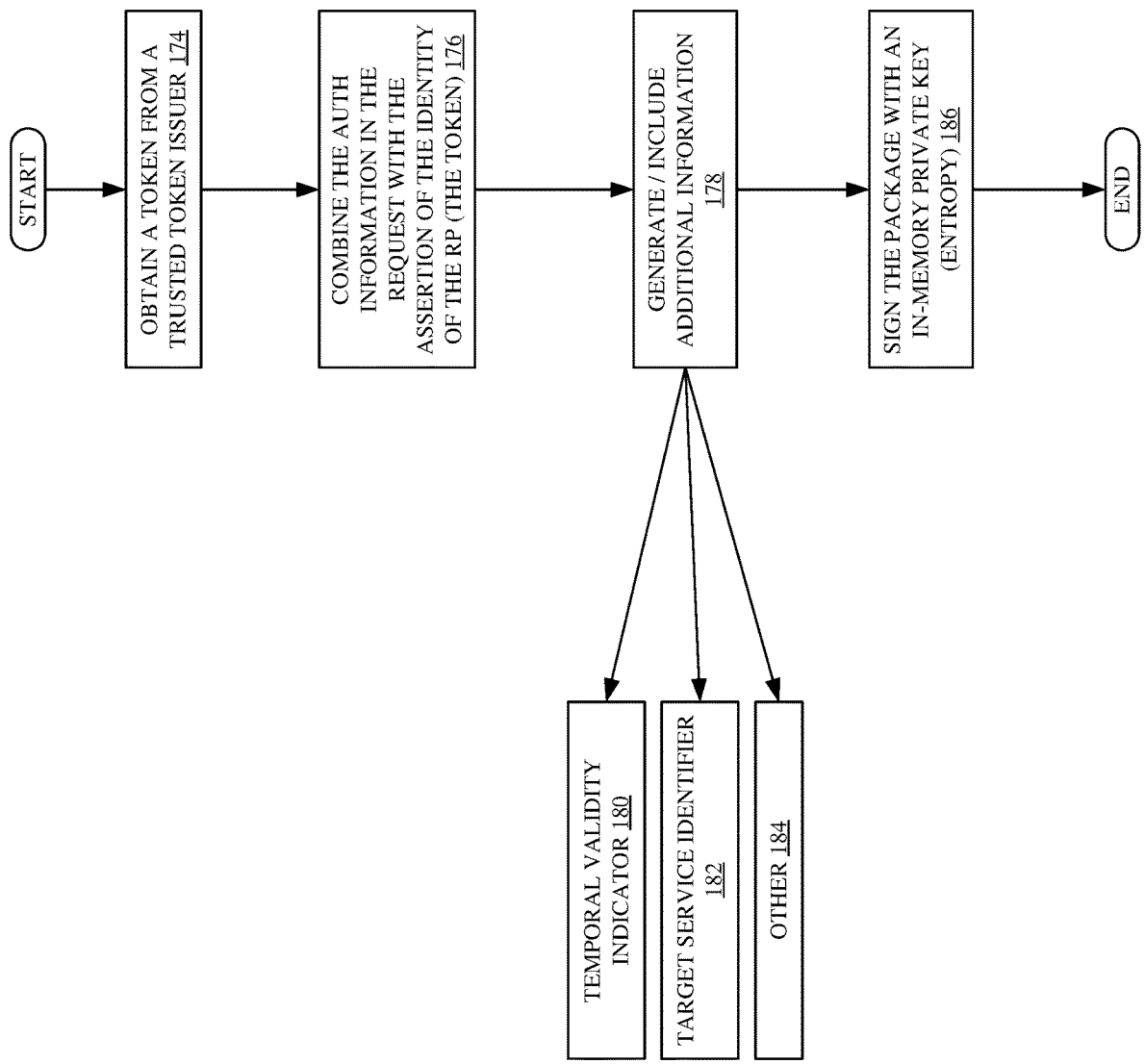
FIG. 4 is a flow diagram illustrating one example of the operation of the AUTH packaging system, shown in FIG. 2, in more detail.

FIG. 4 is a flow diagram illustrating one example of the operation of AUTH packaging system 120 in generating a package for the AUTH information on request 104, in more detail. Unless it already has a token, token processing system 132 obtains a token from the trusted token issuer 114. This is indicated by block 174 in the flow diagram of FIG. 4. The token operates as the assertion as to the identity of routing plane 110.

AUTH/assertion combing system 134 then extracts the AUTH information from request 104 and combines the AUTH information from the request 104 with the assertion of the identity of routing plane 110 (e.g., with the token). This is indicated by block 176. Additional AUTH information generator 136 can generate and include additional information in the package as well. This is indicated by block 178. For instance, generator 136 can generate or include a temporal validity indicator indicating the time window for which the transformed request is valid. Generating and including the temporal validity indicator is indicated by block 180 in the flow diagram of FIG. 4. Generator 136 can generate or obtain a target service identifier 182. This identifies the target service so that the target service can validate that the transformed request was meant for it. Generator 136 can generate and include a wide variety of other information in the package as well, and this is indicated by block 184.

Signing system 138 then signs the package with an in-memory private key from the public/private key pair 126. This is indicated by block 186. It will be noted that the package can be signed with a signing key, or other entropy information can be appended to it. The information that is appended can be examined by the target service to ensure that the transformed request 112 has not been tampered with. Signing the package with an in-memory private key is indicated by block 186.

Request attachment system 139 then attaches the package to the request to generate the transformed request 112, as discussed above, with respect to block 166 in FIG. 3.

Figure 5:
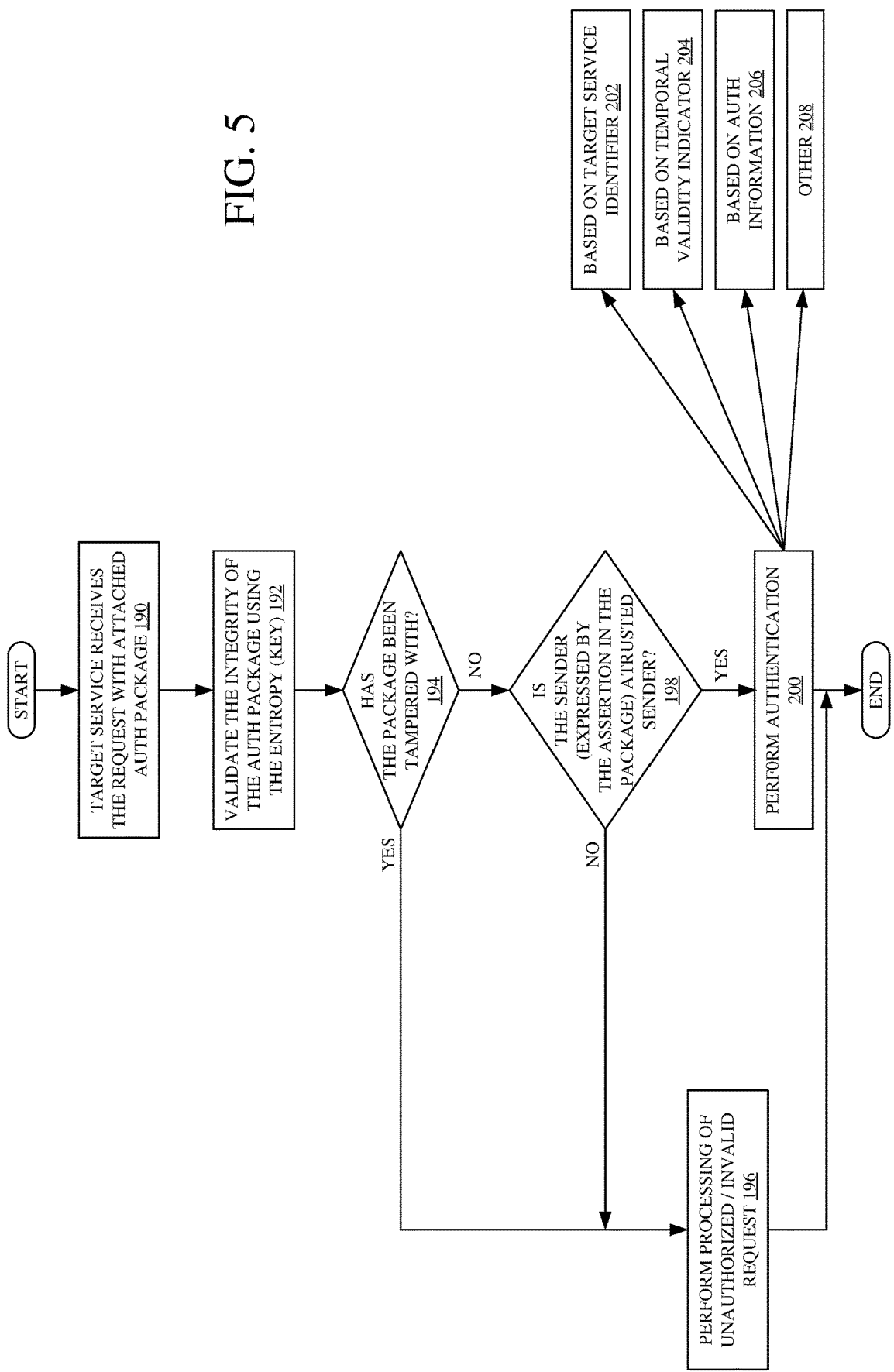
FIG. 5 is a flow diagram illustrating one example of the operation of a target service in performing authentication based on the AUTH package received as part of a request.

FIG. 5 is a flow diagram showing one example of how the target service processes the transformed request 112, that has the AUTH package attached to it. For purposes of the present discussion, it will be assumed that service 106 is the target service, which receives transformed request 112 for processing. Target service 106 thus first receives the transformed request 112 with the attached AUTH package. This is indicated by block 190 in the flow diagram of FIG. 5. The target service then validates the integrity of the AUTH package using the entropy (or a corresponding key that corresponds to the key that was used to sign the package). This is indicated by block 192. This validation is used to determine whether the package has been tampered with. Making that determination is indicated by block 194 in FIG. 5. If the package has, indeed, been tampered with, then the service 106 performs processing of an unauthorized or invalid request. This is indicated by block 196. This may include simply rejecting the package or request, surfacing a notification that an invalid or unauthorized request has been received, among a wide variety of other things.

If, at block 194, it is determined that the package has not been tampered with, then the target service 106 determines whether the sender (expressed by the assertion which identifies routing plane 110) is a trusted sender. This is indicated by block 198. For instance, if the target service recognizes the token that is used as the assertion statement, as being issued from a trusted token issuer, then the target service will determine that the sender of the package (the routing plane 110) is a trusted sender.

If, at block 198, the target service 106 determines that the package was not sent by a trusted sender, then again processing reverts to block 196 where the target service 106 can perform processing of an unauthorized/invalid request.

However, if, at block 198, the target service 106 determines that the sender is a trusted sender, then the target service 106 can obtain the authentication information from the AUTH package and perform authentication on that information. This is indicated by block 200. It can first determine whether the target service identifier is identifying the target service properly. This is indicated by block 202. It can determine whether the request is valid based upon the temporal validity indicator. This is indicated by block 204 in the flow diagram of FIG. 5. The target service 106 can then go on to perform authentication using the authentication information that was sent in the original request 104 and repackaged by system 120. This is indicated by block 206. The authentication can be performed by the target service 106 in other ways as well, and this is indicated by block 208.

It can thus be seen that the present description describes a routing plane which performs a very light-weight transformation, in terms of processing and time overhead. The light-weight transformation includes packaging the credentials or other authentication information received from the requesting client with the assertion which asserts the identity of the routing plane. An entropy is used to build a tamper proof package. That package is then attached to the request within an authorization context so that it can be processed by the target service. The target service validates the integrity of the package using the entropy and then determines whether the identity of the sender (the routing plane) identified by the assertion in the package can be trusted and is allowed to forward this type of credentials or AUTH information. If so, the target service performs regular authentication using the received credentials or AUTH information.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
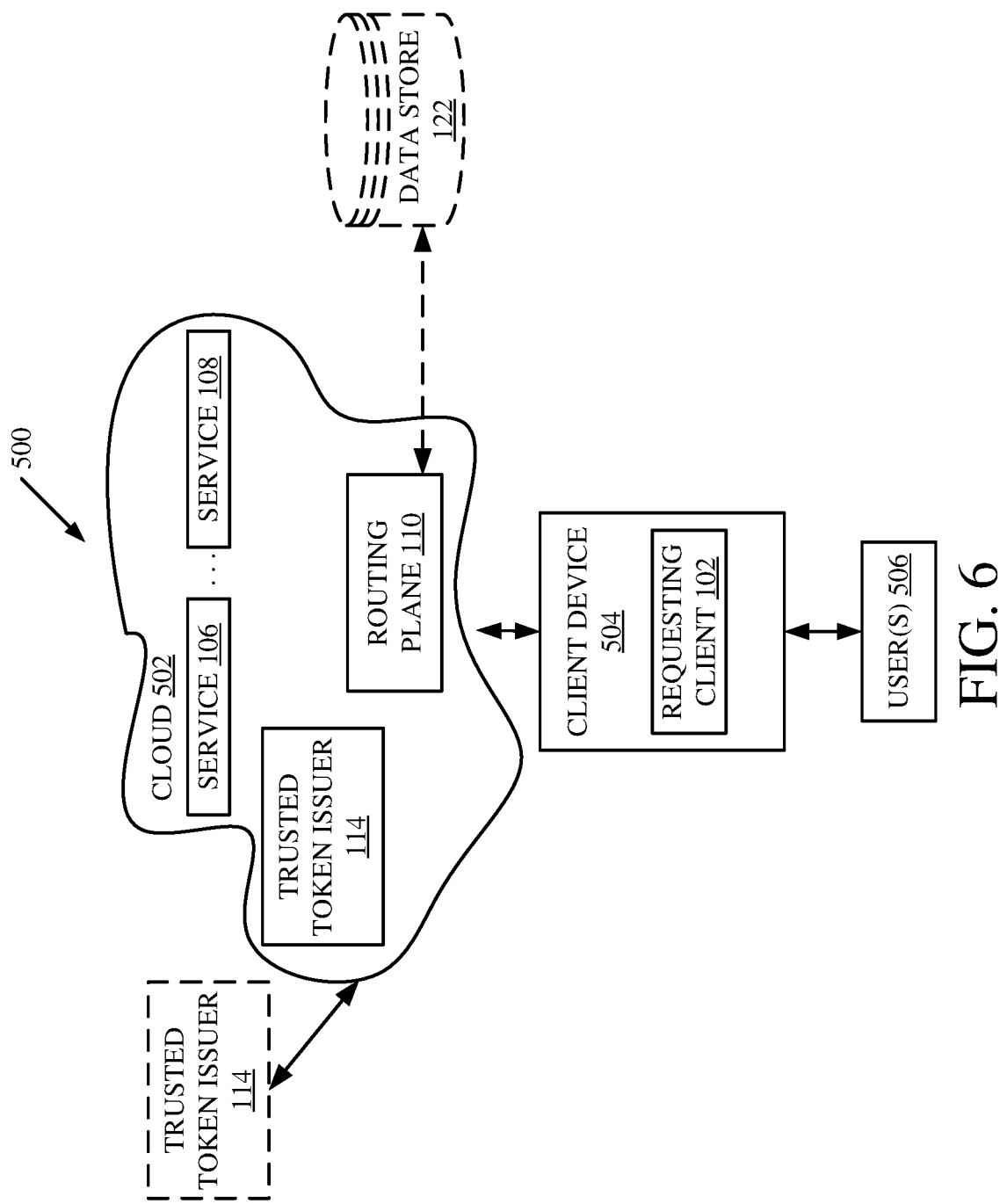
FIG. 6 is a block diagram showing one example of the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that routing plane 110, services 106-108 and trusted token issuer 114 can be located in cloud 502 (which can be public, private, or a combination where portions are public while others are private). Therefore, when the requesting client is a user-facing client, then a user 506 uses a client device 504, that includes the requesting client 102. Client 102 access those systems through cloud 502.

FIG. 6 also depicts another example of a cloud architecture. FIG. 6 shows that it is also contemplated that some elements of architecture 100 can be disposed in cloud 502 while others are not. By way of example, data store 122 can be disposed outside of cloud 502, and accessed through cloud 502. In another example, trusted token issuer 114 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
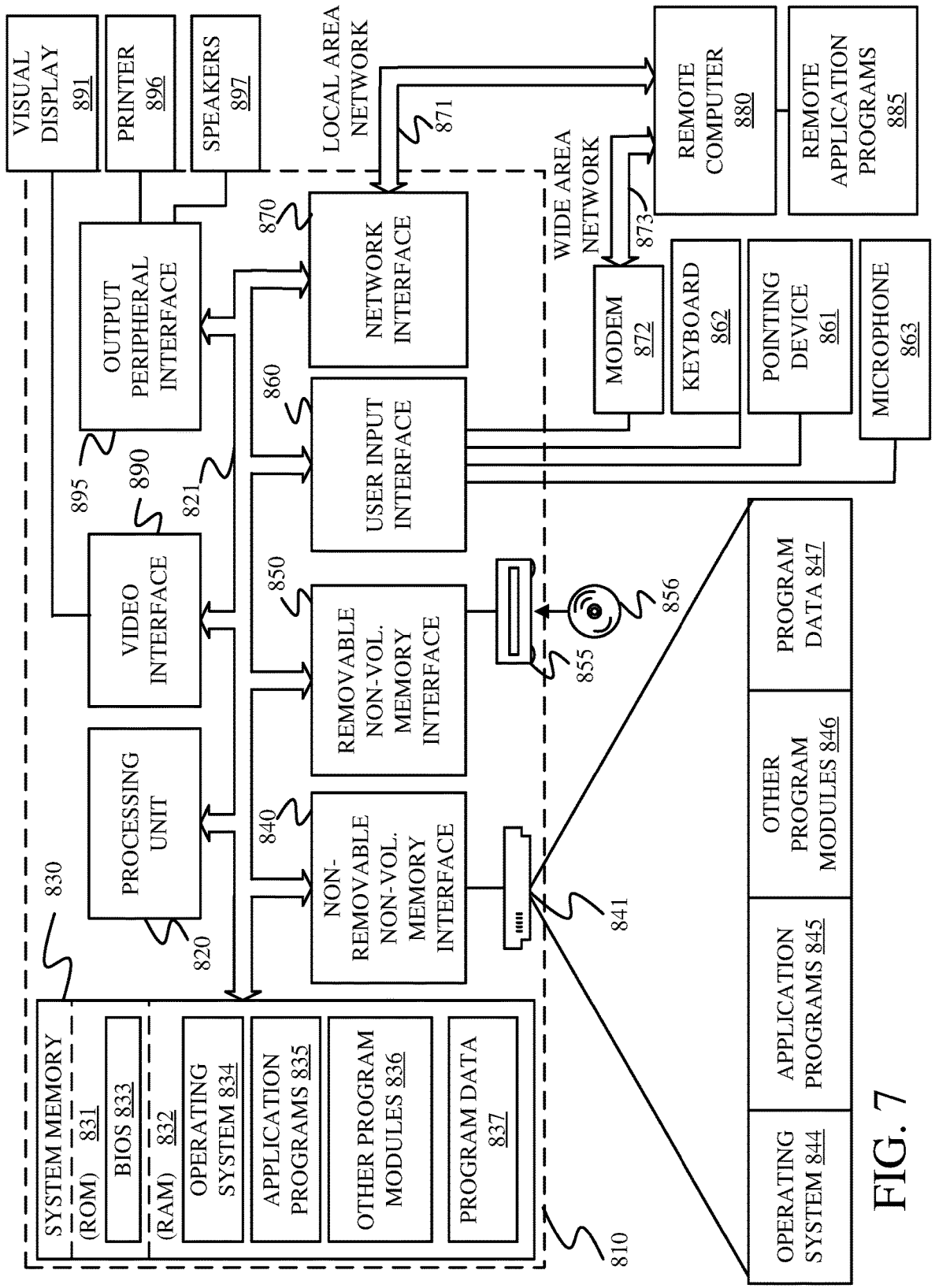
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

Example 1 is a computer implemented method of transforming a request from a requesting client, the method comprising:
  receiving, at a routing plane, the request, the request including client authentication information corresponding to the requesting client;
  combining the client authentication information with assertion information, asserting an identity of the routing plane, to obtain an auth package;
  signing the auth package with a signing mechanism to obtain a signed auth package;
  attaching the signed auth package to the request to obtain a transformed request;
  identifying a target entity to receive the transformed request; and
  routing the transformed request to the target entity.

Example 2 is the computer implemented method of any or all previous examples wherein combining the client authentication information with assertion information comprises:
  obtaining at the routing plane, as the assertion information, an authentication token from a trusted token issuer; and
  combining the client authentication information with the authentication token to obtain the auth package.

Example 3 is the computer implemented method of any or all previous examples wherein signing the auth package comprises:
  obtaining a public/private key pair;
  sharing security information corresponding to the public/private key pair with the target service; and
  signing the auth package with a key from the public/private key pair.

Example 4 is the computer implemented method of any or all previous examples wherein combining the client authentication information with the assertion information comprises:
  removing the client authentication information from the request to obtain a partially transformed request; and
  combining the client authentication information with the authentication token.

Example 5 is the computer implemented method of any or all previous examples wherein attaching the signed auth package to the request comprises:
  attaching the signed auth package to the partially transformed request to obtain the transformed request.

Example 6 is the computer implemented method of any or all previous examples wherein attaching the signed auth package to the partially transformed request comprises:
  attaching the signed auth package to the partially transformed request in an authentication context.

Example 7 is the computer implemented method of any or all previous examples wherein attaching the signed auth package to the partially transformed request in an authentication context comprises:
  attaching the auth package to the request in an authentication header portion of the request.

Example 8 is the computer implemented method of any or all previous examples wherein combining the client authentication information with assertion information, asserting an identity of the routing plane, to obtain an auth package comprises:

obtaining a temporal validity indicator indicative of a time during which the auth package is valid; and adding the temporal validity indicator to the auth package.

Example 9 is the computer implemented method of any or all previous examples wherein combining the client authentication information with assertion information, asserting an identity of the routing plane, to obtain an auth package comprises:

obtaining a target entity identifier indicative of an identify of the target entity for which the auth package is valid; and adding the target entity identifier to the auth package.

Example 10 is a computer implemented method of processing a client request at a target service, the method comprising:

receiving, at the target service, the client request from a routing plane, the client request including an auth package;

processing a signature on the auth package, at the target service, to determine that the auth package has not been tampered with;

authenticating an assertion, placed in the auth package by the routing plane and being indicative of an identity of the routing plane, to determine that the routing plane is trusted by the routing pane; and authenticating the client request using client authentication information corresponding to a client that sent the client request to the routing plane.

Example 11 is the computer implemented method of any or all previous examples and further comprising:

prior to authenticating the client request, validating that the client request is temporally valid based on a temporal validity identifier in the auth package.

Example 12 is the computer implemented method of any or all previous examples and further comprising:

prior to authenticating the client request, validating that the client request is intended for the target service based on a target service identifier in the auth package.

Example 13 is a computer system, comprising:

a routing system on a routing plane that receives a client request from a requesting client, the request including client authentication information corresponding to the requesting client;

an auth packaging system that combines the client authentication information with assertion information, asserting an identity of the routing plane, to obtain an auth package;

a signing system that signs the auth package with a signing mechanism to obtain a signed auth package; and a request attachment system that attaches the signed auth package to the request to obtain a transformed request, the routing system identifying a target entity to receive the transformed request and routing the transformed request to the target entity.

Example 14 is the computer system of any or all previous examples and further comprising:

a token processing system, on the routing plane, that obtains, as the assertion information, an authentication token from a trusted token issuer, the combining system combining the client authentication information with the authentication token to obtain the auth package.

Example 15 is the computer system of any or all previous examples wherein the signing system is configured to obtain a public/private key pair and share security information corresponding to the public/private key pair with the target service and sign the auth package with a key from the public/private key pair.

Example 16 is the computer system of any or all previous examples wherein the combining system is configured to remove the client authentication information from the request to obtain a partially transformed request and combine the client authentication information with the authentication token.

Example 17 is the computer system of any or all previous examples wherein the request attachment system is configured to attach the signed auth package to the partially transformed request to obtain the transformed request.

Example 18 is the computer system of any or all previous examples wherein the request attachment system is configured to attach the signed auth package to the partially transformed request in an authentication header portion of the request.

Example 19 is the computer system of any or all previous examples wherein the combining system is configured to obtain a temporal validity indicator indicative of a time during which the auth package is valid and add the temporal validity indicator to the auth package.

Example 20 is the computer system of any or all previous examples wherein the combining system is configured to obtain a target entity identifier indicative of an identify of the target entity for which the auth package is valid and add the target entity identifier to the auth package.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of transforming a request from a requesting client, the method comprising:

receiving, at a routing plane, the request, the request including client authentication information corresponding to the requesting client;

combining the client authentication information with assertion information, asserting an identity of the routing plane, to obtain an auth package;

signing the auth package with a signing mechanism to obtain a signed auth package;

attaching the signed auth package to the request to obtain a transformed request;

identifying a target entity to receive the transformed request; and routing the transformed request to the target entity.

2. The computer implemented method of claim 1 wherein combining the client authentication information with assertion information comprises:

obtaining at the routing plane, as the assertion information, an authentication token from a trusted token issuer; and combining the client authentication information with the authentication token to obtain the auth package.

3. The computer implemented method of claim 1 wherein signing the auth package comprises:

obtaining a public/private key pair;

sharing security information corresponding to the public/private key pair with the target service; and signing the auth package with a key from the public/private key pair.

4. The computer implemented method of claim 2 wherein combining the client authentication information with the assertion information comprises:
removing the client authentication information from the request to obtain a partially transformed request; and
combining the client authentication information with the authentication token.

5. The computer implemented method of claim 4 wherein attaching the signed auth package to the request comprises:
attaching the signed auth package to the partially transformed request to obtain the transformed request.

6. The computer implemented method of claim 5 wherein attaching the signed auth package to the partially transformed request comprises:
attaching the signed auth package to the partially transformed request in an authentication context.

7. The computer implemented method of claim 6 wherein attaching the signed auth package to the partially transformed request in an authentication context comprises:
attaching the auth package to the request in an authentication header portion of the request.

8. The computer implemented method of claim 1 wherein combining the client authentication information with assertion information, asserting an identity of the routing plane, to obtain an auth package comprises:
obtaining a temporal validity indicator indicative of a time during which the auth package is valid; and
adding the temporal validity indicator to the auth package.

9. The computer implemented method of claim 1 wherein combining the client authentication information with assertion information, asserting an identity of the routing plane, to obtain an auth package comprises:
obtaining a target entity identifier indicative of an identify of the target entity for which the auth package is valid; and
adding the target entity identifier to the auth package.

10. A computer implemented method of processing a client request at a target service, the method comprising:
receiving, at the target service, the client request from a routing plane, the client request including an auth package;
processing a signature on the auth package, at the target service, to determine that the auth package has not been tampered with;
authenticating an assertion, placed in the auth package by the routing plane and being indicative of an identity of the routing plane, to determine that the routing plane is trusted by the target service; and
authenticating the client request using client authentication information corresponding to a client that sent the client request to the routing plane.

11. The computer implemented method of claim 10 and further comprising:
prior to authenticating the client request, validating that the client request is temporally valid based on a temporal validity identifier in the auth package.

12. The computer implemented method of claim 10 and further comprising:
prior to authenticating the client request, validating that the client request is intended for the target service based on a target service identifier in the auth package.

13. A computer system, comprising:
a routing system on a routing plane that receives a client request from a requesting client, the request including client authentication information corresponding to the requesting client;
an auth packaging system that combines the client authentication information with assertion information, asserting an identity of the routing plane, to obtain an auth package;
a signing system that signs the auth package with a signing mechanism to obtain a signed auth package; and
a request attachment system that attaches the signed auth package to the request to obtain a transformed request, the routing system identifying a target entity to receive the transformed request and routing the transformed request to the target entity.

14. The computer system of claim 13 and further comprising:
a token processing system, on the routing plane, that obtains, as the assertion information, an authentication token from a trusted token issuer, the combining system combining the client authentication information with the authentication token to obtain the auth package.

15. The computer system of claim 13 wherein the signing system is configured to obtain a public/private key pair and share security information corresponding to the public/private key pair with the target service and sign the auth package with a key from the public/private key pair.

16. The computer system of claim 14 wherein the combining system is configured to remove the client authentication information from the request to obtain a partially transformed request and combine the client authentication information with the authentication token.

17. The computer system of claim 16 wherein the request attachment system is configured to attach the signed auth package to the partially transformed request to obtain the transformed request.

18. The computer system of claim 17 wherein the request attachment system is configured to attach the signed auth package to the partially transformed request in an authentication header portion of the request.

19. The computer system of claim 13 wherein the combining system is configured to obtain a temporal validity indicator indicative of a time during which the auth package is valid and add the temporal validity indicator to the auth package.

20. The computer system of claim 13 wherein the combining system is configured to obtain a target entity identifier indicative of an identify of the target entity for which the auth package is valid and add the target entity identifier to the auth package.

* * * * *